United States Patent [19]
Disselbeck

[11] Patent Number: 5,571,352
[45] Date of Patent: Nov. 5, 1996

[54] VEHICLE TIRES HAVING A THREE-DIMENSIONAL REINFORCEMENT STRUCTURE

[75] Inventor: Dieter Disselbeck, Bad Soden, Germany

[73] Assignee: Hoechst Aktiengesellschaft

[21] Appl. No.: 372,917

[22] Filed: Jan. 17, 1995

Related U.S. Application Data

[62] Division of Ser. No. 976,344, Nov. 13, 1992, Pat. No. 5,447,776, which is a continuation of Ser. No. 555,945, Jul. 19, 1990, abandoned.

[30] Foreign Application Priority Data

Jul. 21, 1989 [DE] Germany ............... 39 24 178.5

[51] Int. Cl.$^6$ ............... B60C 9/00; B60C 9/02; B60C 9/18
[52] U.S. Cl. ............... 152/526; 152/548; 152/DIG. 14
[58] Field of Search ............... 428/166, 72, 174, 428/180, 250, 245, 247, 254; 152/175, 78, 548, 538, 526, 169, 187, 176, 179, 188, 192, 196–197, 209 R, 451, DIG. 14; 139/420 R, 421, 387 R, 388, 383 B; 66/190, 202

[56] References Cited

U.S. PATENT DOCUMENTS

| | | | |
|---|---|---|---|
| 1,209,986 | 12/1916 | Mason | 428/247 |
| 1,387,391 | 8/1921 | Hall | 428/247 |
| 1,602,810 | 10/1926 | Villiers | 428/247 |
| 2,054,619 | 9/1936 | Freedlander | 74/233 |
| 4,116,159 | 9/1978 | Long | 118/34 |
| 4,559,258 | 12/1985 | Kiuchi | 428/156 |
| 4,631,221 | 12/1986 | Disselbeck et al. | 428/166 |
| 5,158,821 | 10/1992 | Gebauer et al. | 428/174 |
| 5,364,686 | 11/1994 | Disselbeck et al. | 428/174 |

FOREIGN PATENT DOCUMENTS

| | | | |
|---|---|---|---|
| 0084978 | 8/1983 | European Pat. Off. | 428/172 |
| 1389394 | 1/1965 | France | 428/245 |

Primary Examiner—Adrienne C. Johnstone
Attorney, Agent, or Firm—Connolly & Hutz

[57] ABSTRACT

A heavy duty rubber composite has a reinforcement structure composed of a network material made from a three-dimensionally shaped textile material forming an open-mesh three-dimensional network which penetrates the rubber material three-dimensionally in a skeleton-like manner. The network material is advantageously firmly incorporated into the rubber composite by appropriately linking the network material with the other reinforcements present in the rubber composite.

5 Claims, 2 Drawing Sheets

VEHICLE TIRES HAVING A THREE-DIMENSIONAL REINFORCEMENT STRUCTURE

CROSS-REFERENCE TO RELATED APPLICATIONS

The present application is a division of application Ser. No. 07/976,344, filed Nov. 13, 1992, now U.S. Pat. No. 5,447,726, which in turn is a continuation of application Ser. No. 07/555,945, filed Jul. 19, 1990, now abandoned.

DESCRIPTION

The present invention relates to heavy duty rubber composites, in particular vehicle tires, having a three-dimensional reinforcement structure, to a specially designed or shaped reinforcement structure and also to a process for the preparation thereof.

The subject-matter of the invention will be explained below in detail using vehicle tires as an example. The features disclosed here similarly apply also to the other rubber composites within the scope of the invention, such as, for example, heavy duty V-belts, rubber conveyor belts and the like.

BACKGROUND OF THE INVENTION

A fundamental problem in the construction of vehicle tires is to satisfy, simultaneously and optimally, the various requirements relating to tread properties. This optimization has, in particular, to do with combining a high wet skid resistance with a low rolling resistance and a long service life under high stress. One of the central problems of tire construction and also of the preparation of other heavy duty rubber composites is to counter the delamination tendency.

Vehicle tires and also other rubber composites are composed of rubber and reinforcements which are usually in the form of two-dimensional fabrics of steel wire and/or textile cord embedded in a plurality of layers in the rubber. A disadvantage of this laminar arrangement of the fabric layers is the lack of isotropy, there being relatively little tenacity between the individual fabric layers. While optimal strength is achieved in the longitudinal and transverse directions of the fabric layers, there is no fiber reinforcement perpendicular to these directions so that the tenacity between the reinforcements is due only to the adhesion of the rubber vulcanizates to the steel wire or to the textile cord. This carries the risk that on applying high stress, in particular flexural loads, to the rubber composite, in particular to the vehicle tire, or on mechanical damage, the fabric layers may separate from one another and the rubber composite, in particular the vehicle tire, is destroyed.

SUMMARY OF THE INVENTION

One object of the present invention is to provide heavy duty rubber composites, in particular heavy duty vehicle tires, having improved properties and greater safety.

This object is achieved according to the invention using rubber composites, in particular vehicle tires, having a textile reinforcement structure, which are distinguished by the fact that the reinforcement structure is composed of a three-dimensionally shaped network material forming an open-mesh network, this network material penetrating the rubber material three-dimensionally in a skeleton-like manner.

Within the scope of this invention, the adjectives "shaped" and "re-shaped" describe the three-dimensional geometric shape of the network material. They do not indicate that the material need necessarily have been prepared from an originally different geometric shape by a specific shaping or re-shaping process.

A network material whose geometry nevertheless corresponds to that of the network material which is present in the rubber composites according to the invention has been disclosed in EP-A-158,234. Its essential feature is a three-dimensional network containing rods, knots and cavities so that the network material can be penetrated by other substances such as, for example, the rubber material of a vehicle tire.

The open meshes of the filigree-like network structure of the network material are a characteristic geometric feature of this material. They are formed, for example, from the deep-drawn meshes of a sheet-like textile material such as, for example, a cross-ply fixed by extensible weft threads, a Raschel knit or a fabric, particularly however a knitted fabric. If the sheet-like base material used for the network material is a cross-ply in which the filament bundles cross at angles of about 5° to 30°, or if a fabric is used, it is necessary that the sheet-like textile material is composed of fibers or at least contains an effective proportion of fibers, which themselves have a relatively high extensibility, which may be reversible or non-reversible, so that the material has an adequate deep-drawability. A fibrous material having a high non-reversible extensibility is composed, for example, of partly oriented filaments which are prepared by spinning at a relatively high spinning take-off speed. In contrast, the deep-drawability of knitted fabrics is substantially independent of the extensibility of the fibrous material. Consequently, preference is given to the use of a knitted fabric as the basis for the preparation of the network materials present in the tires. In principle, the fibrous material of the sheet-like textile materials is of minor importance. However, it is selected so as to comply optimally with the intended use. With regard to the adhesion between the filaments of the network material and the rubber, it is advantageous to prepare the network material from natural fiber yarns such as, for example, cellulose yarn. As long as maximum strength of the network material is not required, such as, for example, in the case of less highly stressed tires, it is consequently advantageous to use a network material composed of, for example, cellulose staple fibers. However, while the physical properties of natural fibers can only be influenced to a small extent, the physical properties of synthetic fibers can be optimally adapted to the desired use. Consequently, in the preparation of the network materials present in the tires, it is particularly preferable to start from synthetic fiber materials such as, for example, polyamides, aramides, polyacrylonitrile and polyolefin fibers, and in particular from polyester materials. In using polyester materials, particular preference is again given to those types which have a particularly high mechanical strength. Examples of fibrous materials of this type are the commercial product high-tenacity ®TREVIRA and end-group-capped polyester materials which are particularly resistant to chemical influences. It is also particularly advantageous to use those polyester types which are particularly rubber-compatible such as, for example, the commercially available polyester types ®TREVIRA 715 from Hoechst AG. The three-dimensionally shaped network materials are preferably, and particularly if they are composed of a fibrous material of reversible extensibility, dimensionally stabilized by resin impregnation of the textile material using a thermoplastic or thermoset resin. If a relatively low-softening, partly oriented fibrous material is used, it is possible to dispense with a resin impregnation as a separate step, since the thermoplastic filament material itself assumes the function of a thermoplastic resin. Consequently, dimensional stabilization using a thermoplastic, within the scope of this invention, is also understood to mean the dimensional stabilization which results from the softening of the thermoplastic filaments of the re-shaped sheet-like textile material.

If an irreversibly re-shapable fibrous material is used to prepare the network material by deep-drawing or is used in the preparation of the network material by shaping processes other than deep-drawing, for example by special weaving processes, it is likewise possible to dispense with resin treatment using a thermoplastic or thermoset resin if the natural stability of the network structure allows this structure to be incorporated into the rubber material.

The dimensional stabilizing resins which are present, if appropriate, in the network materials can be derived from the various known groups of thermoplastic or thermoset resins to the extent that the mechanical properties of these resins allow the dimensional stabilization of the network materials according to the invention. Examples of suitable thermoplastic resins are polyacrylates or polyvinyl chloride; however, preferred resins are thermosets, such as, for example, melamine resins and in particular phenolic resins.

The amount of resin present in the three-dimensionally re-shaped network materials is determined, relative to the weight of the textile material, so that on deep-drawing of the sheet-like textile material, the meshes open to give a filigree network. Suitable applied amounts are in the range of from 50 to 500, preferably 100 to 300 g of resin/$m^2$ of the unstretched textile material. Within these given ranges, the amount of resin is advantageously further adapted to the basis weight of the deep-drawable textile material. Accordingly, on using a heavy textile material, the upper half of the given ranges will apply, and on using light textile materials, the lower half of the ranges will apply. The essential criterion is, as given above, the requirement that on deep-drawing, the meshes of the textile material open to give a network.

The three-dimensional re-shaped network material according to the invention has a large number of introduced shapes which extend at least in one direction having a component perpendicular to the original plane of the flat textile material from which the network material according to the invention has been prepared.

In an embodiment which has been specified in particular with regard to further use as a skeleton material for the preparation of the rubber composite, the network material according to the invention has a large number of protuberances arranged regularly on a base. In another embodiment, the network material according to the invention has a large number of protuberances and hollows arranged regularly on the plane of the original base. The protuberances and hollows may be cup-shaped on a circular or polygonal base or be, for example, bar-shaped. However, the protuberances and hollows may also have other shapes, depending on the particular case, for example the shape of cones or truncated cones, pyramids or truncated pyramids on different polygonal bases, or cylinders, prisms, or segments of spheres. Particular preference is also given to having the peaks or peak-surfaces of the protuberances all on one plane and parallel to the base, this applying in exactly the same way to the hollows.

Furthermore, it is advantageous if the number, size, shape and three-dimensional arrangement of the introduced shapes per unit area of the flat material is selected so that the mathematical product of the magnitude of the surface of the original plane remaining after re-shaping and the magnitude of the surfaces of the protuberances, or the product of the magnitude of the plateau surfaces of the protuberances, and the floor surfaces of the hollows is as large as possible.

Moreover, it is advantageous if the number, magnitude, shape and three-dimensional arrangement of the introduced shapes per unit area of the flat material are selected so that they give optimal adhesion taking into account the different porosity or other consistency of the rubber material used in a particular instance.

DETAILED DESCRIPTION

The network material to be used according to the invention can obviously also have other three-dimensional introduced shapes. It is also quite possible that in the network material according to the invention which has been three-dimensionally re-shaped, the surface of the original textile material is no longer present at all if, for example, the deep-drawing of the material has been carried out from both sides of the textile surface using male dies so that in the material cup-like or hat-like introduced shapes alternate upwards and downwards, or if the original textile surface has been drawn out from both sides into a zigzag surface using a large number of short male dies which extend in the same longitudinal direction, and the textile surface has been stabilized in this shape.

The above mentioned process for the preparation of the network material present in the tires according to the invention by deep-drawing a deep-drawable, sheet-like textile material is a particularly advantageous method of carrying out the present invention and characterizes the essential features of the network material by virtue of the outcome of the process.

However, the network material can obviously be prepared by other shaping processes as well such as, for example, special weaving processes which are suitable for preparing an optionally resin-stabilized textile material which, as described above, has been three-dimensionally re-shaped and has the characteristic open-mesh network structure of the network material which can be prepared by deep-drawing.

The above-described network structure is initially present in the form of a sheet-like material, ie. its entire geometric shape conforms to a flat sheet-like three-dimensional element whose thickness is governed by the geometric protuberances. This network material can be incorporated in a vehicle tire by producing, from the flat structure, a section adapted to the tire width and tire circumference. Owing to the high flexibility of the network material, this can be incorporated in the structure of the carcass and belt of the tire according to the invention. At the Join between the beginning and end of the strip of network material which has been laid round the tire structure, a permanent link is advantageously ensured. This link can be achieved, for example, by welding, bonding, stitching or by similar means.

Figure 1:
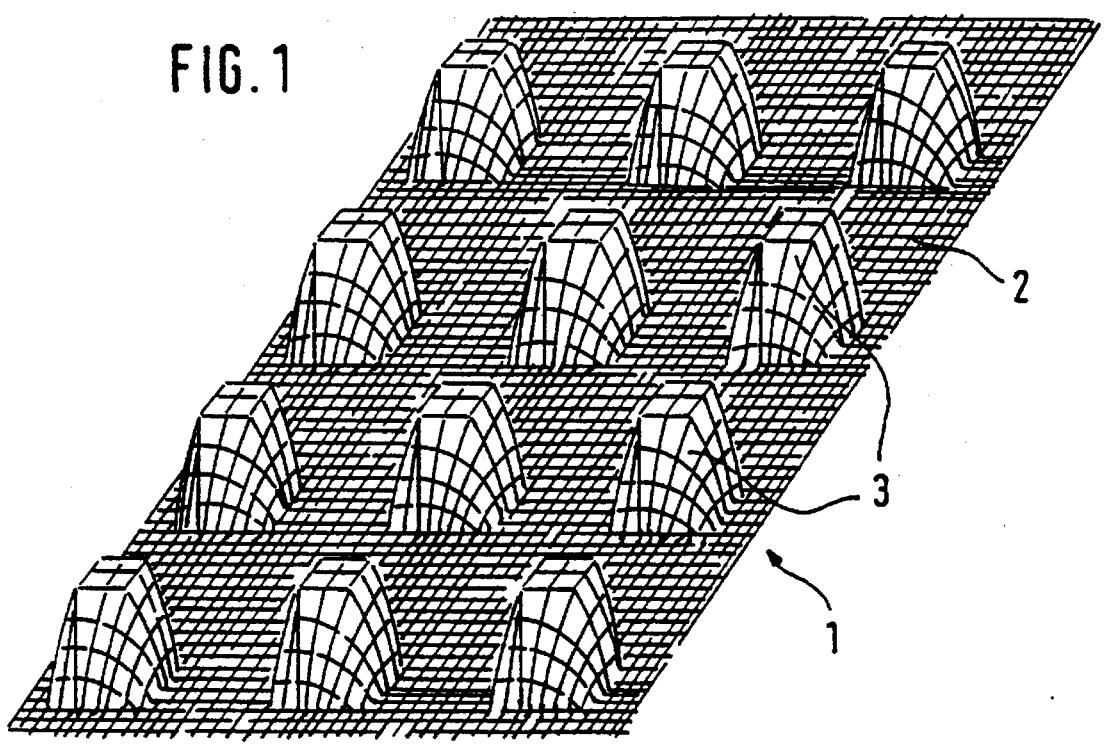
FIG. 1 gives a diagrammatic view of a section of a possible embodiment of the network material (1) present in the tires according to the invention, this having a large number of hat-like protuberances (3) on a base (2).
Figure 2:
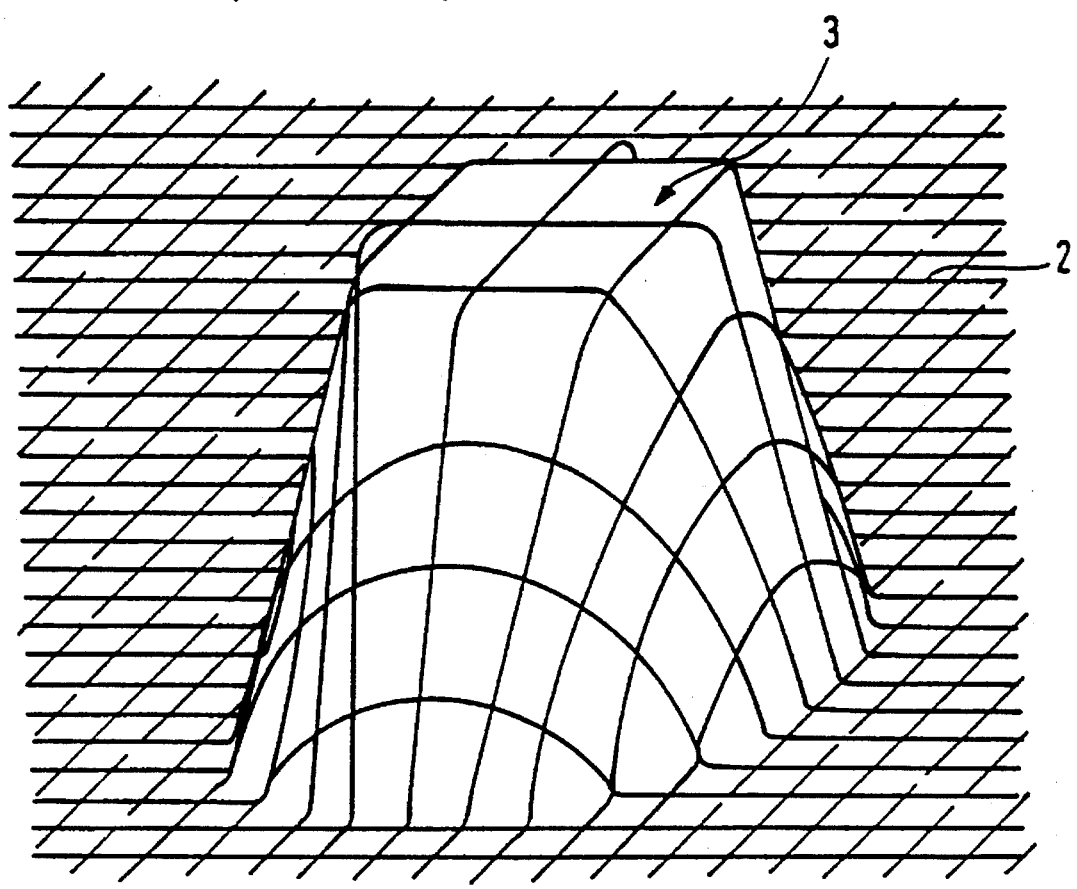
FIG. 2 shows an enlargement of the diagrammatic representation of one of the hat-like introduced shapes and clearly demonstrates the drastic enlargement of the mesh structure of the textile material which occurs in the region of the introduced shape.
Figure 3:
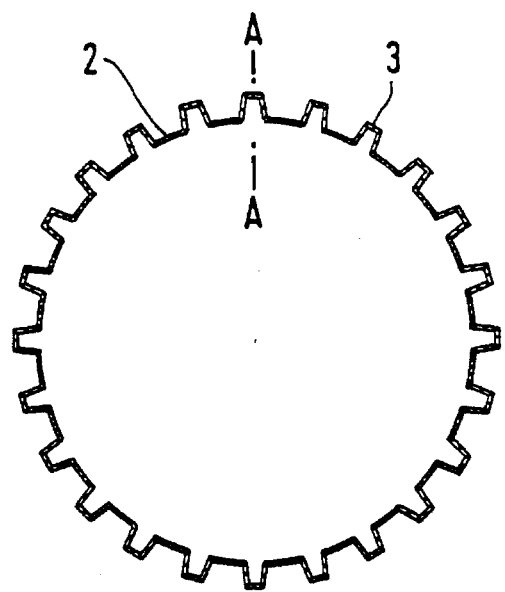
FIG. 3 is a cross-sectional view of the reinforcement structure in annular form for use in a vehicle tire construction.
Figure 4:
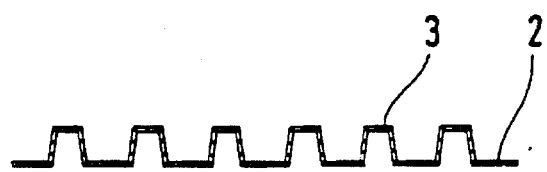
FIG. 4 is a sectional view taken along plane A—A of FIG. 3.
Figure 5:
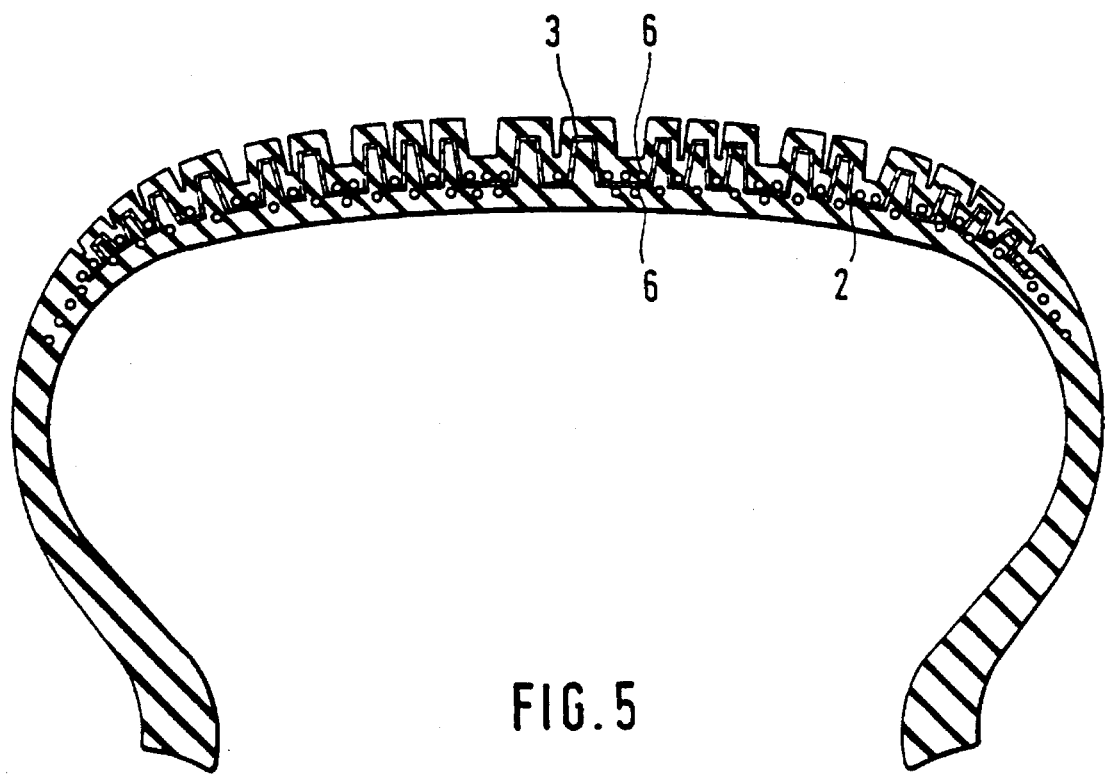
FIG. 5 is a sectional view through a vehicle tire with the reinforcement structure embedded therein.

All of the complications which can arise in connection with the Join of the incorporated network material of the tire according to the invention can be avoided if the reinforcement structure used is in the form of a seamless ring. According to the prior art, the fabric layers present as reinforcements in vehicle tires all have a join which is naturally a point of weakness in the structure. Compared with this known principle, a seamless, annular reinforcement structure gives significantly greater safety. Consequently, the present invention likewise provides a network material in the form of an annular reinforcement structure. FIG. 3 shows a section in the annular plane through a seamless, annular reinforcement structure according to the invention. With a base (2) and hat-like protuberances (3). FIG. 4 shows a section in the plane A—A, perpendicular to the annular plane, through the seamless, annular reinforcement structure according to the invention. FIG. 5 shows a section, perpendicular to the annular plane, through a vehicle tire according to the invention whose rubber material has been penetrated in a skeleton-like manner by a network material, the base plane (2) of the network material being fixed by layers of cord (6) which run in the direction of the belt filaments.

The present invention furthermore provides a network material in sheet-like form or in the form of a seamless circular article, on the surface of which is provided a rubber-compatible component.

Suitable rubber-compatible components of the network material according to the invention are all those agents already known for this purpose which improve the adhesion between reinforcements and rubber material in vehicle tires, conveyor belts, V-belts and similar high-tenacity rubber articles.

If the network materials present in the high strength rubber composites according to the invention are composed of staple fibers, in particular natural fibers, such as, for example, cellulose yarns, all of the known adhesion-promoting systems are suitable, in particular also the familiar resorcinol-formaldehyde resins in combination with latices (RFL-dip). If the network material has been formed from synthetic fibers, in particular from continuous fiber yarns, it is advantageous to use more modern types of adhesion promoters containing, in particular, special latices such as, for example, a vinyl-pyridine latex (VP latex) which is a copolymer of about 70% of butadiene, about 15% of styrene and about 15% of 2-vinylpyridine. Examples of other latices which are present in adhesion promoters are acrylonitrile rubber latices or styrene-butadiene rubber latices. These can be used as such or in combination with one another. Especially suitable adhesion promoters for polyesters are also those which are applied in multi-stage processes, for instance a blocked isocyanate being applied in combination with polyepoxide and the material then being treated using a customary RFL dip. It is also possible to use combinations of RFL dips with other adhesion-promoting substances such as, for example, a reaction product of triallyl cyanurate, resorcinol and formaldehyde or p-chlorophenol, resorcinol and formaldehyde, as adhesion promoters on the network materials according to the invention.

Detailed information concerning the nature of the adhesion promoters which are used on the network materials according to the invention is given, for example, in "Ullmann's Enzyklopädie der Technischen Chemie", 4th edition, volume 13, pages 622–664 and also in the source literature cited therein.

The firm incorporation of the network material into the rubber composite according to the invention is advantageously carried out by appropriately linking the network material with the other reinforcements present in the rubber composite. In the case of a rubber composite according to the invention in the form of a vehicle tire, it is possible, for example, for the network material to be located on top of the reinforcement fibers of the carcass structure and of the belt structure if it is firmly linked to the carcass and belt by means of suitable anchoring elements, for example a large number of metal or plastic anchors distributed over the structure or by means of anchoring filaments passing through the overall tire structure. However, the network material may also be integrated into the carcass and belt structure of the tire so that a certain proportion of the filaments of carcass and belt, viewed from the wheel center, pass below and another proportion above the base of the network material so that the latter is firmly bound into the overall structure. Furthermore, it is also possible even during preparation of the network material to use a starting material into which by means of special knitting or weaving processes, a proportion of the reinforcements of the carcass and/or of the belt have been incorporated. In this case, it is particularly advantageous if these filaments of the carcass and/or belt which confer the particular strength of the tire penetrate the network material in the zones of least protuberance, in a direction perpendicular to the plane of the tread. If, as is preferable, the network material retains a plane base between the protuberances which extend in a direction perpendicular to the tread, it is advantageous if the filaments of the carcass structure and/or of the belt encircle or penetrate this base.

The heavy duty rubber composites according to the invention are prepared in a manner known per se by impregnating and coating with the rubber material the reinforcements in their combination with the network material, as a rule after applying the adhesion-promoting coat. Coating is understood to mean also the shaping operations which are customary, for example, in the tire industry. A vehicle tire is prepared, for example, by laying the network material together with the cord layers for carcass and belt on to the assembly drum, coating the structure with the tread composition and bringing about the customary shaping by curvature and vulcanization. Alternatively, the network material can also be integrated into the previously prepared tread and applied with this tread. Further process details of these known tire construction procedures are obtainable from E. A. Hauser, Handbuch der gesamten Kautschuktechnologie, published by Union Deutsche Verlagsgesellschaft, Berlin, 1935, J. F. Lehnen, Maschinenanlagen und Verfahrenstechnik in der Gummiindustrie, published by Berliner Union, Stuttgart, 1968, K. Mau, Die Praxis des Gummifachwerkers, published by Berliner Union, Stuttgart, 1951, W. Seyderhelm, J. Frey, Zusammenfassende Darstellung der Rohlingsvorbereitung in der Gummiindustrie, Kautschukgummikunststoffe, vol. 28, page 335, 1975.

One method for the preparation of the three-dimensionally shaped network material is first to impregnate a sheet-like, deep-drawable textile material, preferably a knitted fabric, with one of the abovementioned resins suitable for mechanically stabilizing the introduced shapes. The resins can be applied to the textile material by conventional methods such as painting on, brushing on, by knife application, slop padding or particularly advantageously by dipping. The resin-treated material is then advantageously squeezed out using a pair of squeeze rollers to give the desired resin uptake. The resin treatment of the deep-drawable textile material can alternatively be carried out by subjecting the textile material together with a sheet of a resol (fusible precondensate of a thermoset) to the deep-drawing process. In this process, the molten resin penetrates the textile material and impregnates it in the desired manner.

Thermoplastic resins intended for the impregnation process are advantageously applied in the form of solutions or preferably of emulsions. Heat-curable resins (thermosets) are advantageously applied in commercially available form as highly concentrated aqueous solutions or dispersions. After intermediate drying, if appropriate, the resin-impregnated textile material is subjected to deep-drawing at elevated temperature. The deep-drawing temperature is selected so that thermoplastic resins can be melted and, in this state, can fully penetrate the filaments of the network structure.

The same applies to thermosets; in this case, the temperature of the deep-drawing apparatus is adjusted to reach the flow range of the thermoset. After the resin has melted, the temperature of the deep-drawing apparatus is regulated so that the impregnating resin can harden. If thermoplastics are used, the temperature at this point must be reduced below the melting point of the thermoplastics; if thermosets are used, the temperature of the deep-drawing apparatus can as a rule remain unchanged, since the curing of the thermosets also takes place at elevated temperature. The deep-drawing apparatus is kept shut until the stabilizing resin has completely hardened and the structure of the fibrous material which has been conferred by deep-drawing remains stable. The preparation of the three-dimensionally re-shaped network material is followed by the application of an adhesion promoter to its surface.

As already stated above, the resin treatment and intermediate drying steps during the preparation of the network material can be dispensed with if the natural stability of the network structure, prepared from a textile material having irreversible extensibility, permits incorporation of the structure into the rubber material.

If the network material is used in its preferred embodiment as a seamless annular article, the preparation of this article starts from a section of a tubular knitted fabric, for example from a knitted tube. Employing a similar method to that for a sheet-like textile material, this tubular section is given the desired shape on a suitable deep-drawing apparatus which, for example, has a drum-shaped female die over which the tubular section is pulled, this die having drawing plugs arranged on movable drum segments, which can be inserted from the inside or outside into the holes in the die. In this embodiment also, the knitted tube or section thereof can be subjected to resin impregnation as described above before deep-drawing.

As described above, the network material can, in the form of a three-dimensional reinforcement for the rubber material, be embedded in a great many shapes into the rubber composite, in particular into the tire structure. In the preferred embodiment, as a radial tire, the network material is arranged between the steel or textile belt and the tread, its, for example, cone-shaped, introduced shapes being able to project into the tread profile. In this case, the geometry of the network material can be adapted to the shape of the tread and, if appropriate, to that of the tread profile.

The preferred reinforcement according to the invention in which a continuous (seamless) fibrous structure penetrates the rubber material in a skeleton-like manner gives significant improvements with regard to the tensile strength and tear propagation resistance and the moduli of the rubber composite, and, in the case of vehicle tires, drastically reduces the risk of tread separation. Reinforcement and stabilization extending into the tread profile of the tire is of the greatest importance in particular for tires having a pronounced profile height such as, for example, aircraft tires. This method for avoiding delaminations of the tread is also of special importance in particular in the case of retreaded tires. In this case, the incorporation according to the invention of the network material gives a considerably increased interfacial adhesion and rubber stabilization and thus reduces the delamination of tire components.

As already stated above, in a further preferred embodiment of the present invention, the reinforcement structure of the network material is arranged so that it is simultaneously held by the radial filaments of the carcass and the circumferential filaments of the belt. In this arrangement, the filaments of these reinforcements preferably cross over each other on the network material base plane which has, for example, a large number of nub-shaped protuberances, it also being possible for the individual filament layers to be firmly linked together before incorporation. In this type of construction of the tire according to the invention, the various reinforcements are no longer arranged in the form of separate fabrics in various layers, so that these reinforcements can no longer be separated from one another. Furthermore, in this manner the profile of the tire cross-section can also be advantageously designed, in particular by the individual filament layers of the belt having a different circumference through the cross-section.

The material used for the belt is preferably high-tenacity aramid (completely aromatic polyamides) filaments or steel wires; the material used for the carcass is preferably high-tenacity polyester filaments.

I claim:

1. A vehicle tire including a heavy duty rubber composite comprising a reinforcement structure composed of a network material made from a textile material of natural or synthetic fibers forming a filigree-like open-mesh network containing rods, knots and cavities, the open mesh network being shaped in three dimensions to include a plurality of cup-shaped deformations arranged in a regular pattern and extending in a direction generally perpendicular to a planar portion of the network material, and rubber material surrounding the reinforcement structure.

2. The vehicle tire as claimed in claim 1, wherein the network material forms a seamless reinforcement structure.

3. The vehicle tire as claimed in claim 1, wherein the tire includes a carcass structure and a belt structure each having reinforcement fibers, and the network material is located on top of the reinforcement fibers of the carcass structure and of the belt structure and is anchored by means of anchoring elements in the carcass structure and belt structure.

4. The vehicle tire as claimed in claim 1, wherein the tire includes a tread, a carcass structure, and a belt structure, the carcass structure and belt structure each having reinforcement fibers, a proportion of the reinforcement fibers of the carcass and/or of the belt structure being incorporated into the network material, the proportion of incorporated reinforcement fibers penetrating the network material in the planar portion thereof and extending in a direction perpendicular to the plane of the tread.

5. The vehicle tire as claimed in claim 1, wherein the tire includes a carcass structure and a belt structure each having reinforcement fibers and the planar portion of the network material is encircled or penetrated by the reinforcement fibers of the carcass structure and/or of the belt structure.

* * * * *